(12) United States Patent
Williams

(10) Patent No.: US 12,741,593 B2
(45) Date of Patent: Sep. 22, 2026

(54) TILTING TWIN TUBE AND HEAVY-DUTY BICYCLE CARRIER WITH RAMP

(71) Applicant: Marty Williams, Worland, WY (US)

(72) Inventor: Marty Williams, Worland, WY (US)

( * ) Notice: Subject to any disclaimer, the term of this patent is extended or adjusted under 35 U.S.C. 154(b) by 78 days.

(21) Appl. No.: 18/829,132

(22) Filed: Sep. 9, 2024

(65) Prior Publication Data

US 2025/0083613 A1 Mar. 13, 2025

Related U.S. Application Data

(60) Provisional application No. 63/581,921, filed on Sep. 11, 2023.

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC ..... B60R 9/06; B60R 9/10; B60R 2011/0082; B60R 2011/0085
USPC ....... 224/504, 505, 506, 508, 924; D12/162, D12/407, 408; 410/3
See application file for complete search history.

(56) References Cited

U.S. PATENT DOCUMENTS 7,784,656 B2 * 8/2010 Morrill ..................... B60R 9/10 224/512
8,899,456 B2 * 12/2014 Williams .................. B60R 9/10 224/501
D828,239 S * 9/2018 Williams ..................... D12/162
D828,240 S * 9/2018 Williams ..................... D12/162
10,384,618 B2 * 8/2019 Williams .................. B60R 9/10
12,024,132 B1 * 7/2024 Oshman .................... B60R 9/06
2013/0015221 A1 * 1/2013 Williams .................. B60R 9/06 224/510
2019/0023190 A1 * 1/2019 Breen ....................... B60R 9/10
2021/0170955 A1 * 6/2021 Nusbaum .................. B60R 9/06
2024/0140324 A1 * 5/2024 Gaide ....................... B60R 9/10
2024/0246493 A1 * 7/2024 Gaide ....................... B60R 9/10
2025/0083613 A1 * 3/2025 Williams .................. B60R 9/06

* cited by examiner

*Primary Examiner* — Justin M Larson
(74) *Attorney, Agent, or Firm* — Apex Juris, pllc; Tracy M Heims

(57) ABSTRACT

This invention relates to a heavy-duty cargo carrier, specifically designed for electric bicycles and other heavy bicycles that includes a ramp to help facilitate loading the bicycles and a tilting twin tube where the tilting twin tube allows for the twin tubes to be either locked horizontally or to pivot into an upright, vertical position where they can be locked in place vertically.

13 Claims, 14 Drawing Sheets

TILTING TWIN TUBE AND HEAVY-DUTY BICYCLE CARRIER WITH RAMP

BACKGROUND OF THE INVENTION

Continuity and Claim of Priority

This application is a U.S. non-provisional patent application depending upon and claiming the benefit and priority of U.S. provisional patent application Ser. No. 63/581,921, filed on Sep. 11, 2023.

FIELD OF THE INVENTION

This invention relates to a heavy cargo carrier, specifically designed for electric bicycles and other heavy bicycles. The system includes a ramp to help facilitate loading the bicycles and a tilting twin tube. The tilting twin tube allows for the twin tubes to pivot into an upright, vertical position.

DESCRIPTION OF THE PRIOR ART

The present invention deals with products in the field of cargo management, racks, and specifically bicycle racks. More specifically, it deals with racks designed to hold larger bicycles and e-bicycles that tend to weigh considerably more than a standard bicycle and thus require a more substantial, robust rack style, capable of holding larger weights. This system provides a heavy-duty carrier, a ramp system for loading the e-bicycle onto the carrier, and the tilting twin tube system.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

OBJECTS AND SUMMARY OF THE INVENTION

In view of the foregoing it is an object of the present invention to provide a simple, compact, easily useable bike rack system to load and secure electric bicycles.

It is another object of the present invention to provide an easily storable and useable ramp to facilitate loading and unloading the electric bicycle.

It is yet another object of the present invention to provide twin tubes that are pivotable from a horizontal position to an upright, vertical position, in order to minimize the space used behind a vehicle.

The present invention achieves these objects and other objects that become evident from the following detailed description of the preferred embodiments of the invention by providing a solid, heavy duty bicycle carrier that is easily loadable via an integrated ramp along with a pivotable twin tube system.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the inventive subject matter. References below are made to the representative figures and made a part of this patent application.

DETAILED DESCRIPTION OF THE EMBODIMENTS

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, various examples of the twin tube system are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature or example.

Figure 1:
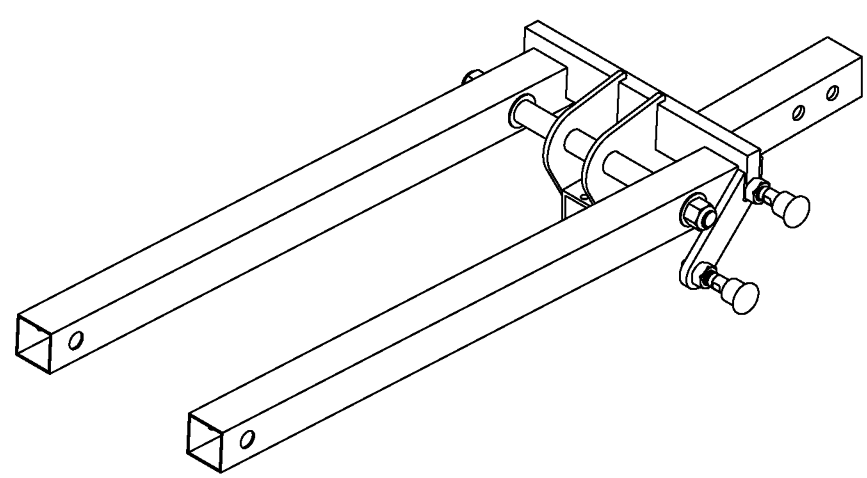
FIG. 1 is an elevated side view of the pivoting twin tube system in the horizontal position.

The invention will now be described in detail with reference to the attached drawings. As described above in the summary there is a need for a device that can easily load and carry heavy bicycles, such as electric bicycles and that can tilt, pivot in order to get the twin tube system out of the way for a driver when not in use. The twin tube apparatus is clearly shown in FIGS. 1 and 2. FIG. 1 showing the system in the horizontal position and FIG. 2 showing the system in the vertical position.

Figure 2:
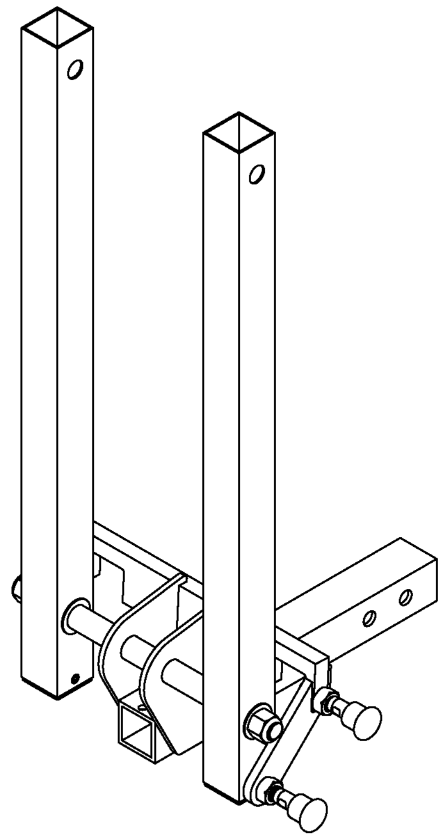
FIG. 2 is an elevated side view of the pivoting twin tube system in the vertical position.

FIG. 1 and FIG. 2 show a pivotable twin tube cargo system 1 attachable to a vehicle hitch receiver, the system having a shank 10, and a vertical plate member 20 where the plate member has a first side 21 with a first lower portion cutout 25, a second side 22 with a second lower portion cutout 26, a back side 24 where the shank is affixed to the backside, and a front side 23, where a pivot apparatus 30 is affixed. The pivot apparatus 30 has a first pivot plate 31 and a second pivot plate 32, where both the first pivot plate 31 and the second pivot plate 32 extend from the plate member front side 23. The pivot plate 20 has first pivot plate hole 33 and a second pivot plate hole 34, where the holes are horizontally aligned for insertion of a horizontal mounting pivot pin 35. A first cargo mounting tube 40 has a first cargo mounting tube first end 41 with a first pivot mounting through hole 42 located therein, and a second end 43. A second cargo mounting tube 50 having a second cargo mounting tube first end 51 with a second pivot mounting through hole 52 located therein and a second end 53 is aligned with the first cargo tube 40 so that the horizontal mounting pivot pin 35 is insertable through the first pivot mounting through hole 42, the first pivot plate hole 33, the second pivot plate hole 34 and the second pivot mounting through hole 52.

This system provides a tilting twin tube system to more securely hold and stabilize bicycles and other cargo on the rear of a vehicle. The cut outs on the vertical plate member are configured so that each of the first cargo tube 40 and second cargo tube 50 matingly fit therein so as to secure them in place, to prevent horizontal motion or to prevent vertical motion. Ideally, the first plate lower cutouts 25, 26 are configured so that when each of the first cargo tube 40 and second cargo tube 50 matingly fit therein, they sit at a slight angle, slanting towards the vehicle. That is, the tubes do not sit totally flat, or horizontal to the ground, but rather sit at a modest angle between 1 and 15 degrees. This slight angle provides ground clearance at the end of the tubes. In other words, the tubes are inclined at the end so that they are lifted somewhat.

Figure 10:
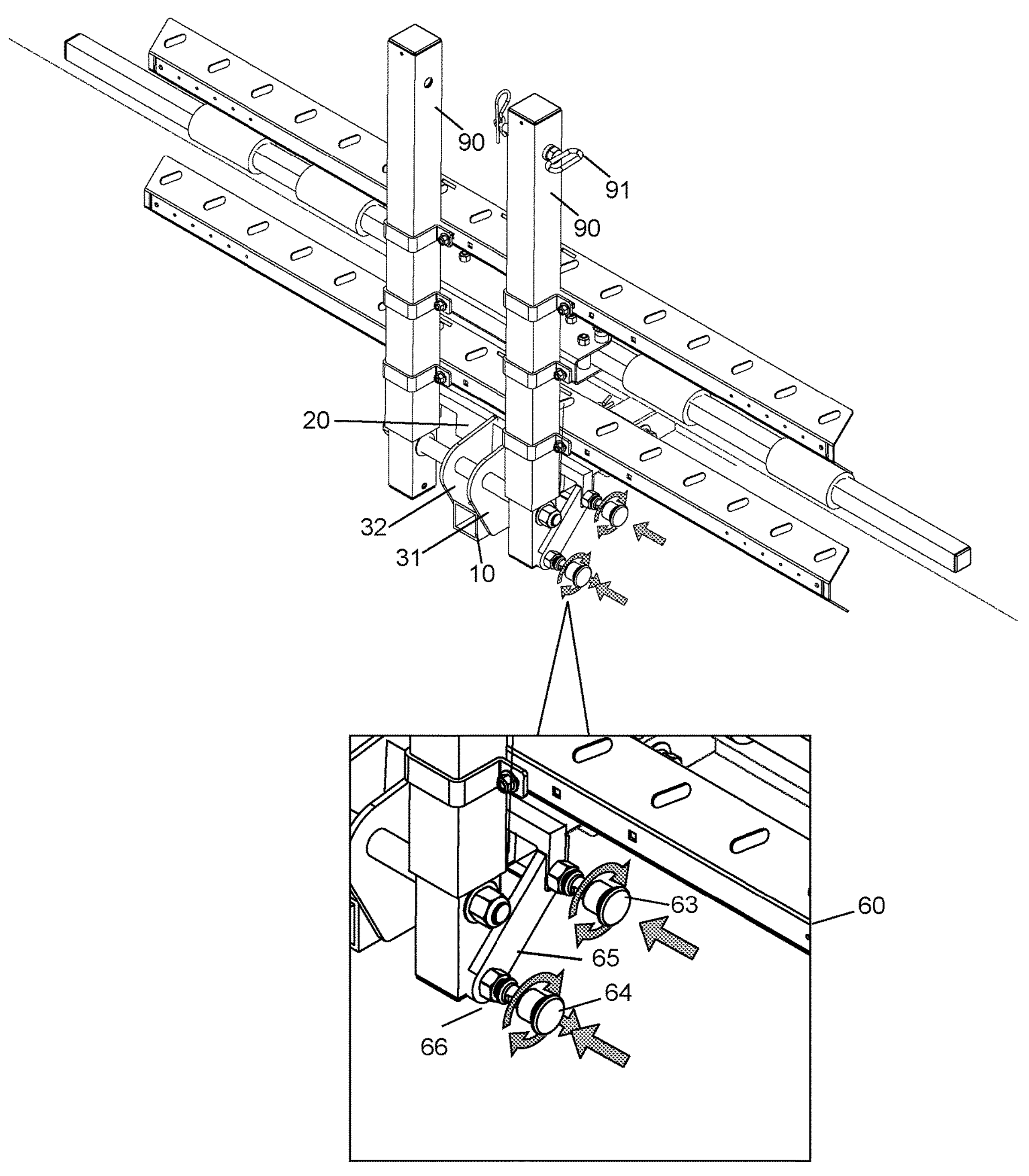
FIG. 10 is a perspective view of the pivoting twin tubes in a vertical position with an enlarged view of a vertical and horizontal locking mechanisms.

In the preferred embodiment, shown in FIGS. 1-4 the tubes are lockable in either a horizontal or vertical position. To accomplish this the pivotable twin tube cargo system 1 has a horizontal locking apparatus 60 to secure the first and second cargo mounting tubes in place horizontally. In one embodiment this locking apparatus 60 is a locking pin 63. This pin can be screwed into place where the pin is threaded and the holes are matingly threaded, it could have a cotter pin on one side, it could be a nut and bolt, or any other mechanism to secure and hold the tubes in place horizontally. In one embodiment the horizontal locking apparatus 60 is a horizontal locking pin 60 that is inserted through a hole in the pivot plate 36 and a horizontally aligned hole in the first cargo mounting tube 42. Ideally this locking pin is threaded and the through holes are matingly threaded to tightly and securely lock the tubes in place horizontally. Once screwed into place tube movement is prevented. The system can also lock vertically such that the tubes are stored in a vertical position against the back of the vehicle. To accomplish this the pivotable twin tube cargo system has a vertical locking apparatus, as shown in FIG. 10, to secure the first and second cargo mounting tubes in place vertically. The vertical locking apparatus 64 has an angle arm 65 having a first end affixed to and extending outwardly from the vertical plate front side 21 and an angle arm second end having a through hole 66 and when the first and second cargo mounting tubes are in the vertical position the vertical locking apparatus 64 is inserted through the angle arm second end through hole 66 and a horizontally aligned vertical locking hole in the first cargo mounting tube 44, thereby locking and affixing the tubes in position.

As noted above, and as shown in the figures, the tubes matingly fit within the plate cutouts. Specifically, when the first and second mounting tubes are in the horizontal position, the first mounting tube matingly fits within the vertical plate member first lower portion cutout; and the second mounting tube matingly fits within the vertical plate member second lower portion cutout, thereby securing the first and second mounting tubes in place horizontally. Also as noted above, the tubes are not secured in an entirely horizontal position. Preferably the plates cause the tubes to have a slight pitch towards the vehicle, causing the tube ends to be higher, thus creating more ground clearance at the back of the cargo carrier.

It is also desirable to have extendable tubes. In order to provide this feature a first extension tube 90 is removably connectable and securable to the first cargo mounting tube; and a second extension tube 90 is also removably connectable securable to the second cargo mounting tube, and the first extension tube and the second extension tube are configured to extend the length of the first cargo mounting tube and the second cargo mounting tube. These extension tubes are secured in place using a fastener. In a preferred embodiment a pin is used, but any type of securing apparatus can be used to secure the tubes in place. These extension tubes create more space for additional cargo, such as extra bicycles or other cargo.

The twin tube system, shown in the vertical position in FIG. 1 and the horizontal position in FIG. 2, is particularly useful when carrying bicycles and is easily configured to do so. In order to accomplish this, as shown in FIGS. 3, 4, 6-9 and 11-12, the pivotable twin tube cargo system further has a bicycle tray 71 where the bicycle tray is removably affixable to the first and second mounting tubes. In one embodiment the bicycle tray 71 is affixed using hat brackets. In another preferred embodiment the pivotable twin tube cargo system has an adjustable V-shaped bicycle rack having a first wing 81 and a second wing 82. In this embodiment a bike wing base is used to secure the first and second wings 81, 82. These wings are connected to the base but are designed to be rotatable so that the wings can be dropped down and stored horizontally, or they can be raised up and locked in position so that bicycles can be secured thereto. The wings are locked in place by a first bike wing locking member 83 and a second bike wing locking member 84. The wings can also have members that allow for the wings to extend in length, thus providing even more adaptability for different sized bicycles or other cargo.

Figure 3:
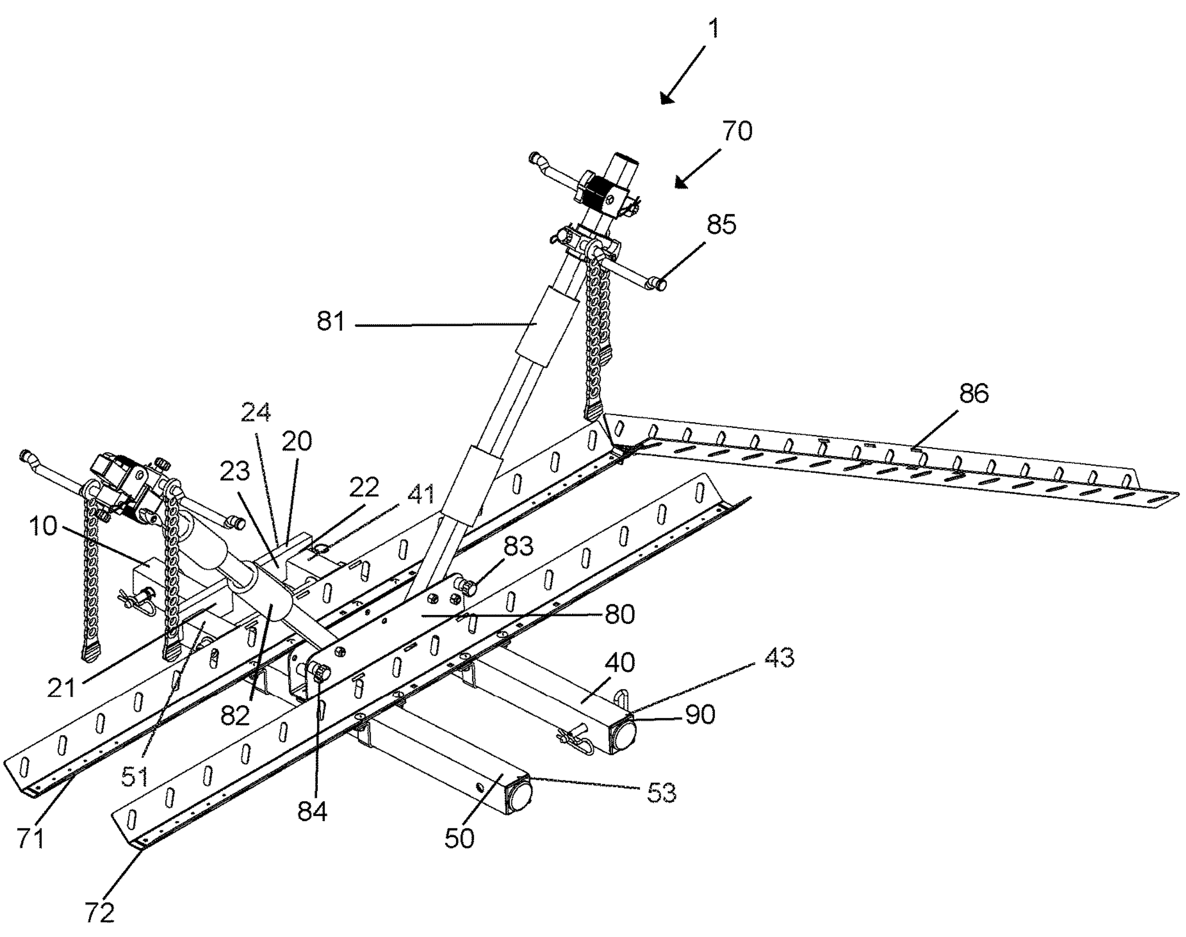
FIG. 3 is an elevated view of the pivoting twin tube, bicycle carrier system with a loading ramp installed.
Figure 4:
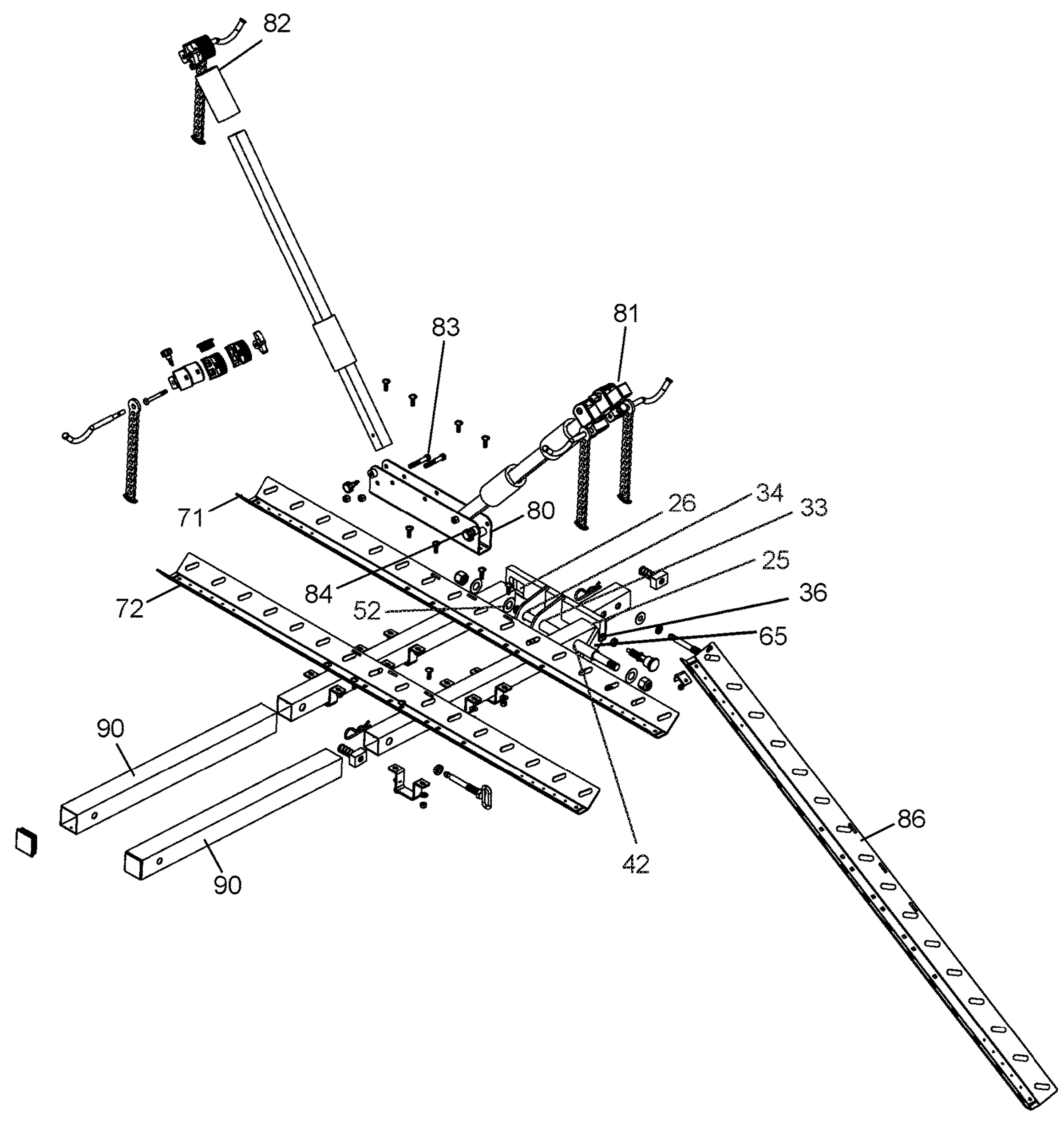
FIG. 4 is an elevated, partially exploded view of the pivoting twin tube system.

FIGS. 3 and 4 show how to attach adjustable wings. In this embodiment there is a wing bracket mounted to the top of the twin tubes with attachment hardware. In this embodiment the hardware and connectors are hat brackets but the wing bracket can be secured in any of a variety of ways as long as it is securely mounted to the top of the twin tubes. These wings are used to hold and carry bicycles.

Figure 8:
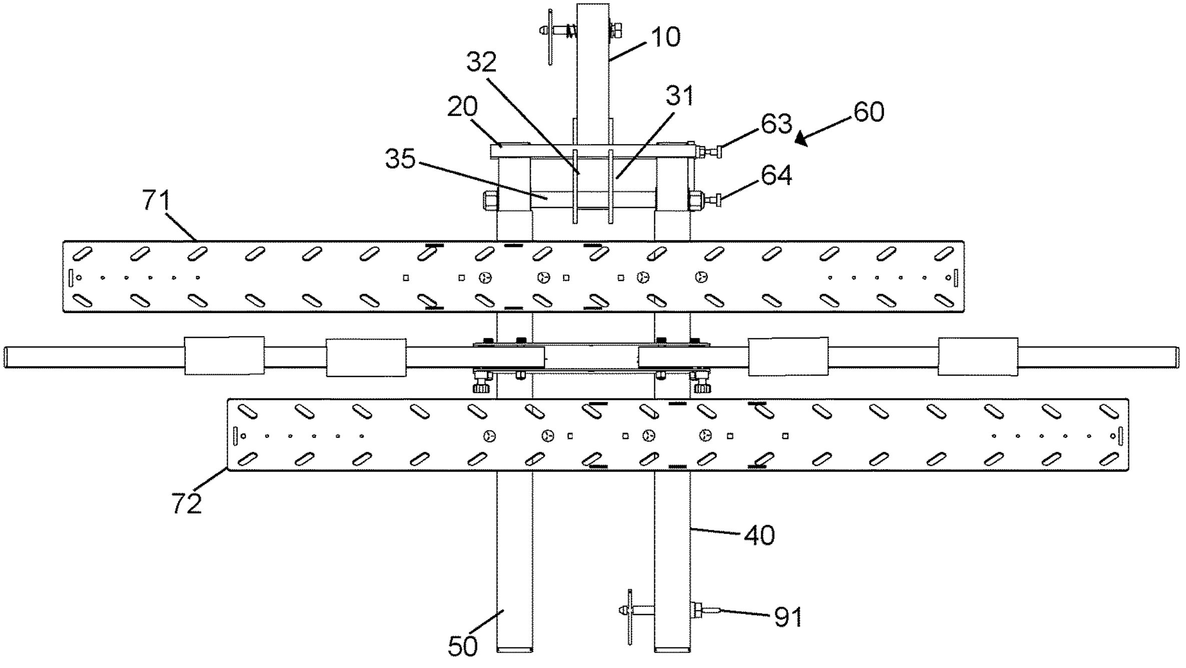
FIG. 8 is a top view of the pivoting twin tube system of the present invention with bike trays installed in a staggered configuration.

FIG. 4 shows a perspective, partially exploded view of the twin tubes with cargo tubes ready to mount thereon, a Wing Bracket mounted on top of the slide tubes with a pair of steel trays. These trays are secured to the twin tubes using fasteners, and in this embodiment the fasteners are hat brackets. These steel trays can be placed either centered on the slide tubes or offset if needed for greater bike fit, as shown in FIG. 8. That is, it may be easier to store bicycles on the trays of they are offset. This moves the bicycles further apart one from the other and prevents pedals and handlebars from interfering with each other.

Many bicycle carrying apparatus today feature an arm that is raised up and over the top of the wheel to secure the bicycle in place. This requires a large, additional part and is sometimes complicated to lock into place. The present invention secures the bicycle by hanging the bicycle by the wheels. This is accomplished via the bike wings. Each bike wing has a wheel hanger 86 or wheel mount that hangs from the wing. Each arm has a slideable member that can be moved along the length of the wing. Mounted on each member is the wheel hanger 86. The bicycle tire is simply lifted slightly up and over the hanger 86. A securement strap is affixed to the hanger at one end, then the other end is strapped up and over the top of the wheel and is secured again to an end of the hanger 86, tightly securing the wheel in place.

Finally, the system has a loading member 85. This loading member is an elongated, solid member, preferably metal, that is strong enough to withstand the weight of an electric bicycle. In one embodiment is in the shape of a channel. It must be able to carry at least 150 pounds or more without breaking or bending. This ramp has a unique design that allows for water drainage, connectability, and is specifically configured to secure bicycle tires within a trough created by the loading member material.

Figure 5:
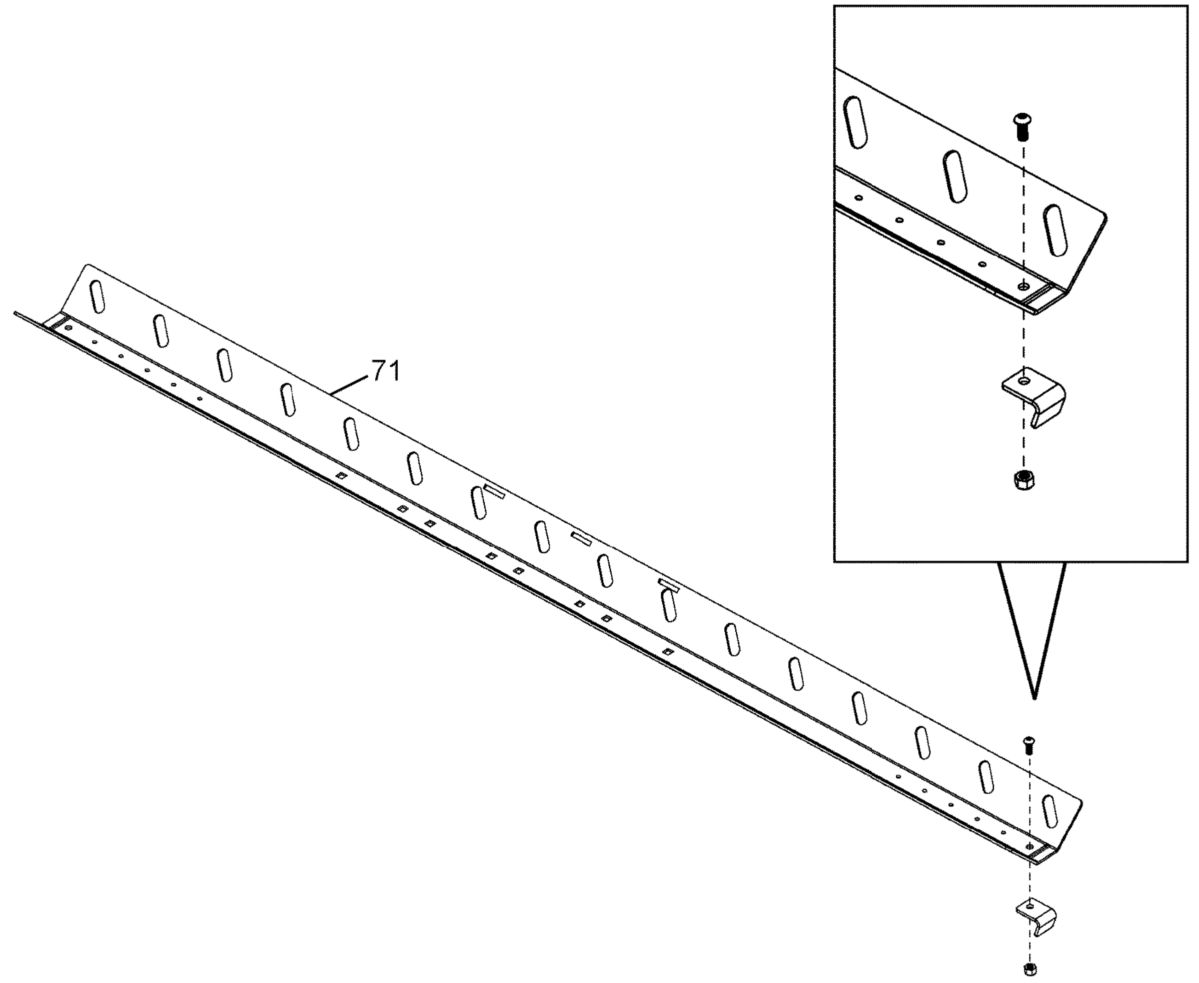
FIG. 5 is a view of the loading ramp of the present invention.

When the ramp, shown in FIG. 5, is not in use it is stored. It is simply secured to the steel trays using a strap, preferably a cam buckle strap.

Figure 11:
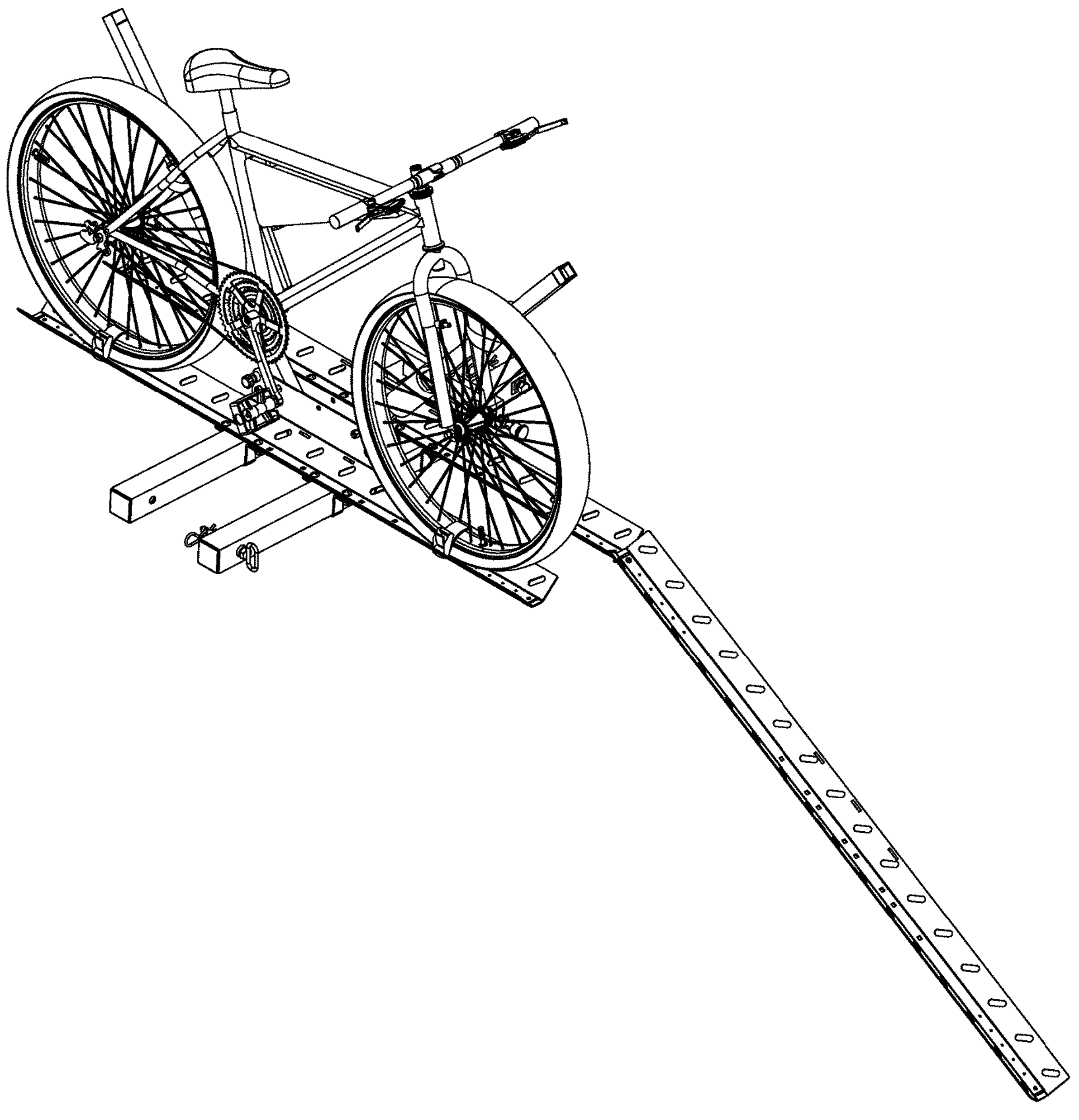
FIG. 11 is a perspective view of the pivoting twin tube system, loading ramp and bicycle loaded on one bicycle tray.
Figure 12:
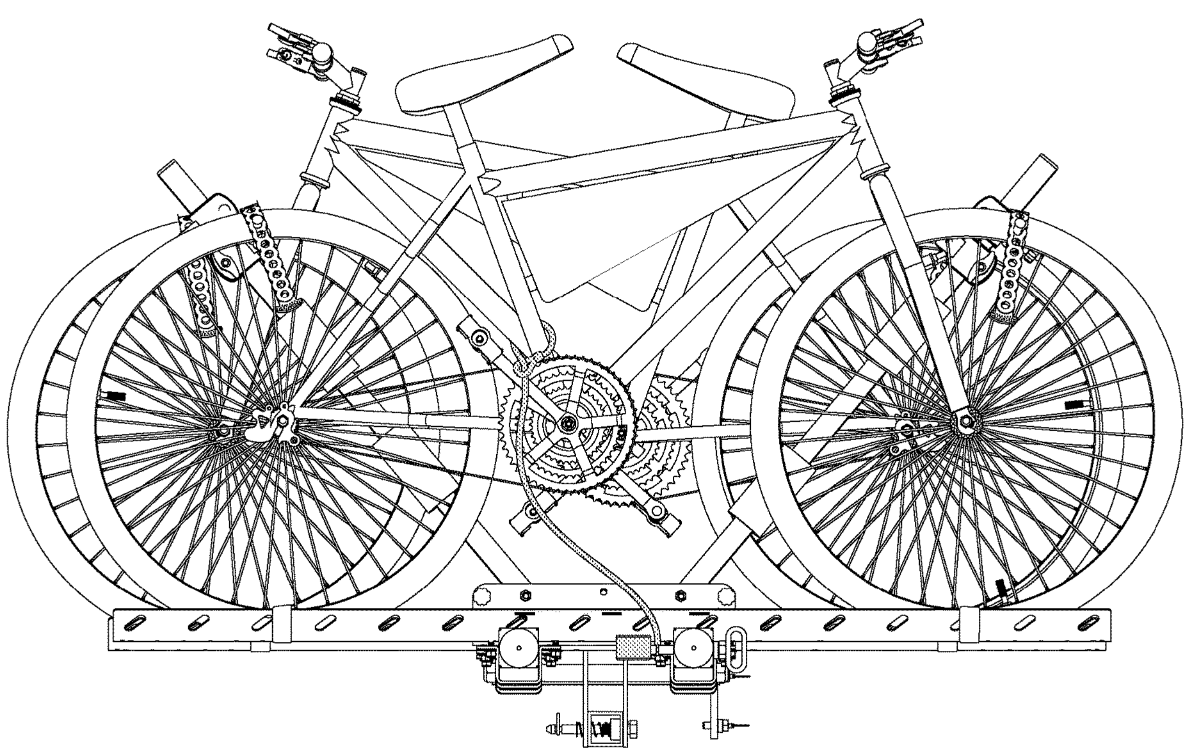
FIG. 12 is a rear view of the pivoting twin tube system with two bicycles loaded on the bicycle trays.

FIGS. 11-12 show how a bicycle is secured to the Wings. To secure a bicycle the bicycle wheel is mounted using a hanger that is attached to the Wing. The wheel is mounted to the steel tray using cam buckle straps and the cam buckle secures the bicycle in place. The bicycle is loaded onto the steel tray and the wheels are then hung on the wheel cradles, as shown in FIGS. 11-12. Once hung on the wheel cradle a strap is used to secure the wheel to the wheel cradle. Straps are used to secure both wheels to the trays and another pair of straps are used to secure the wheels to the cradles, securing the bicycle at four separate points, preventing motion.

FIG. 3 shows a cradle used in the present embodiment. Here the cradle is shown with a rubber strap. The strap has a number of holes along the length of the strap. One end of the strap has a hole and the cradle end is slid through the hole. Then the strap is slid to the opposite end of the cradle. When the bicycle tire is hung from the cradle the other end of the strap is pulled up and over the wheel and the strap end is secured via one of the holes to the opposite end of the cradle, thus securing the wheel in place.

FIG. 3 also shows how the cradles are installed to the wings. Basically, the user will loosen handles on each cradle housing, allowing the cradle to open and create a wider center area. The cradle housing is then slid over and onto the wing whereafter the handle is tightened, and the cradle housing clamps to the wing, securing the housing in place. This is done for all of the housing and likewise all of the cradles.

FIGS. 11-12 show how to mount bicycles using the cradles. In summary, the bicycle wheels rest on the metal tray, the wheels are hung from the cradles and are secured in place using the cradle and strap. The bottom of the wheel rests on the metal tray and another strap is run up and through the wheel and that then secures the wheel to the metal tray.

Figure 6:
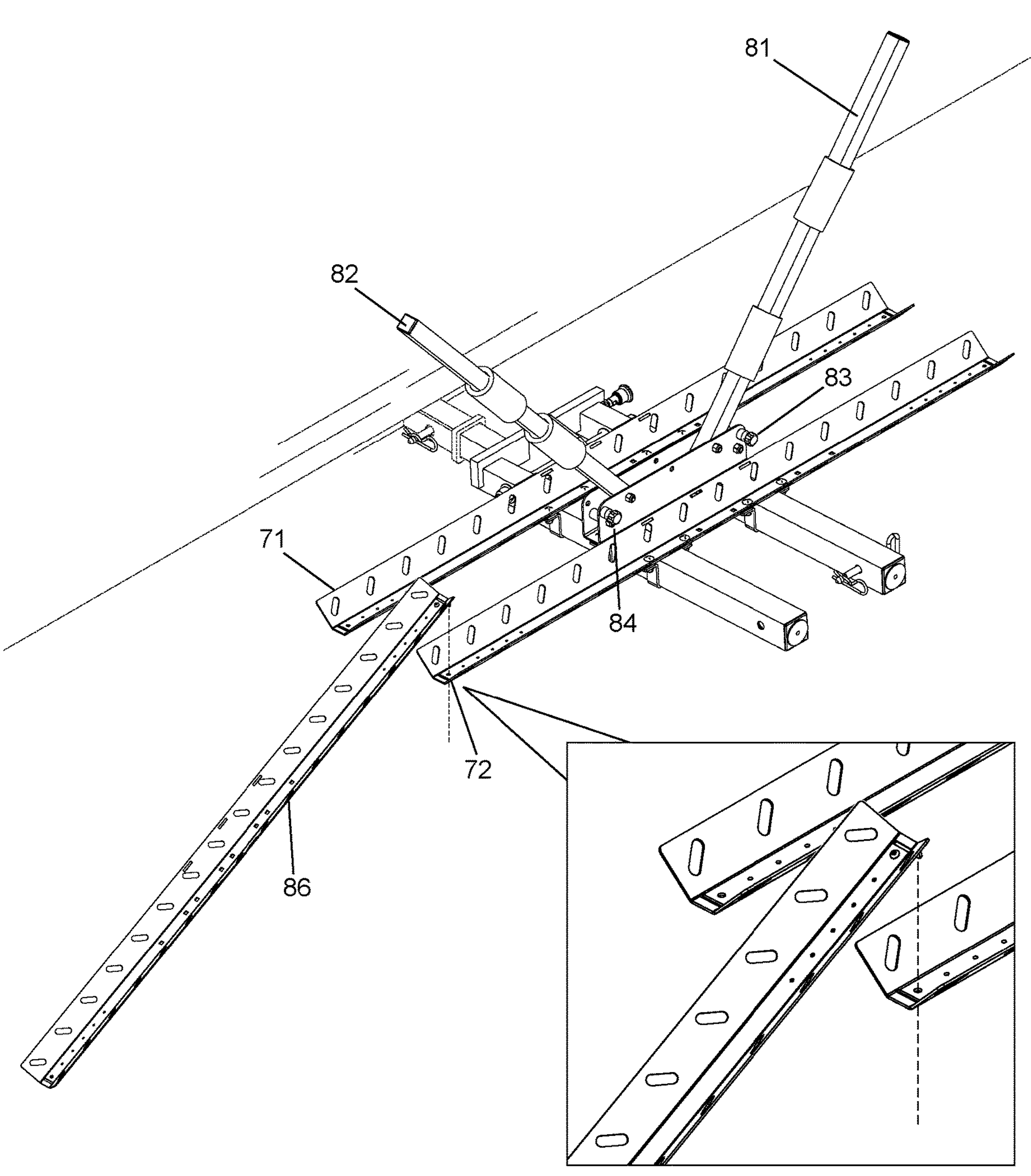
FIG. 6 is an elevated view of the pivoting twin tube system with an enlarged view of the ramp connecting apparatus.
Figure 7:
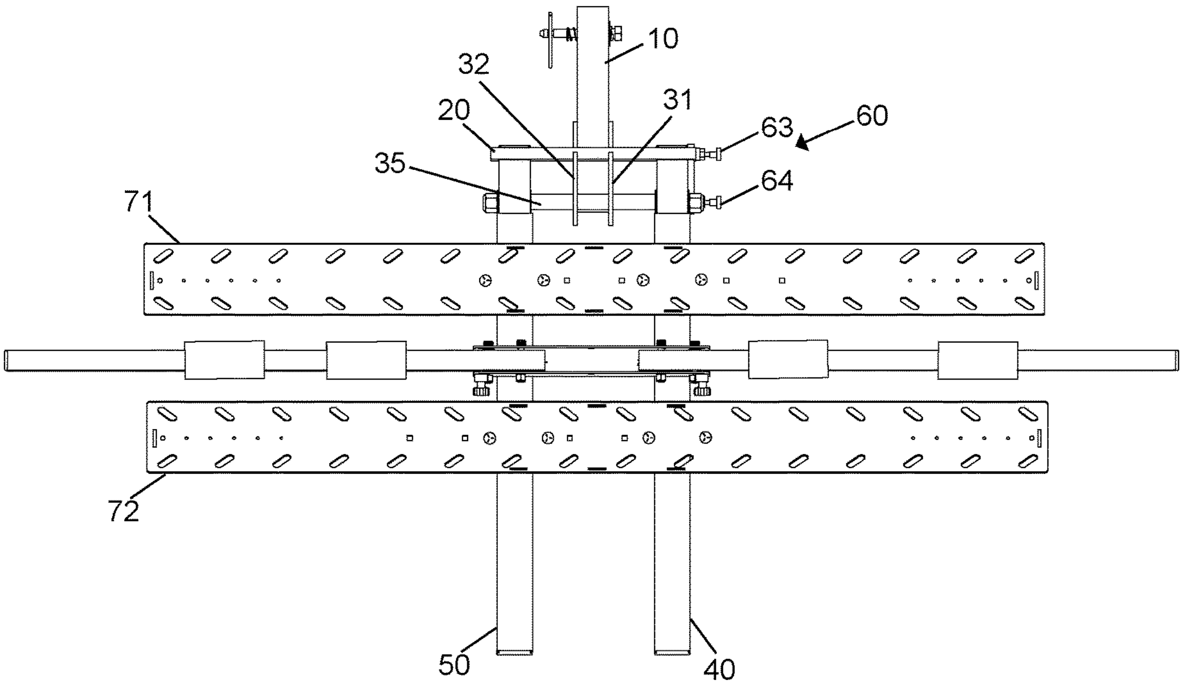
FIG. 7 is a top view of the pivoting twin tube system of the present invention with bike trays installed in the horizontal position.
Figure 9:
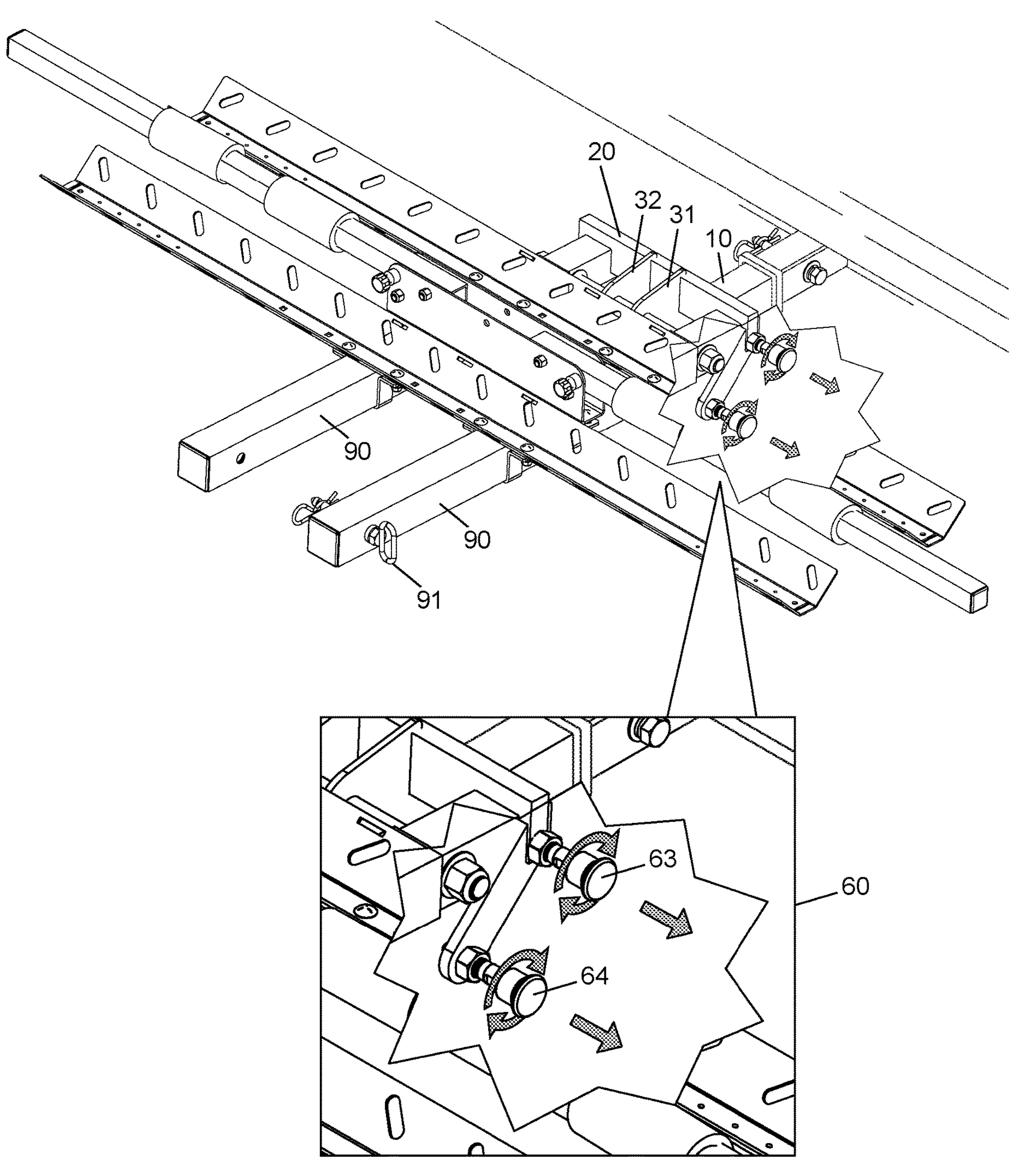
FIG. 9 is a perspective view of the pivoting twin tubes in a horizontal position with an enlarged view of a vertical and horizontal locking mechanisms.

FIGS. 3, 4 and 6 show the operation of the folding wings and the bicycle carrier. On top of the tubes is shown the two metal rails after installation and securement to the twin tubes. FIG. 9 shows the wings in a flat, horizontal position. As can be seen, there is a knob on the wing bracket. To lock the wings down and into place a user simply pulls back on the knob, flattens the wings, and allows the knob to snap back into place, thus locking the wings in the horizontal position. In this embodiment it is a pull knob, but could be any other type of fastening system, including a bolt and nut, a bolt with cotter pin, or any other fastening apparatus.

FIG. 12 shows one way to secure bicycles to the carrier. In this embodiment a locking cable is used. Here, as shown, the locking cable is secured to the carrier at one end. The other end is pulled up and around the bicycle or bicycles frames. Next, the small loop is slid through the large loop of the locking cable, thus creating a closed loop around the bicycle. The small loop is then secured to a silent hitch pin and with the handle, and thereafter the snap-on lock is locked in place, securing the bicycles with the cable.

Figure 13:
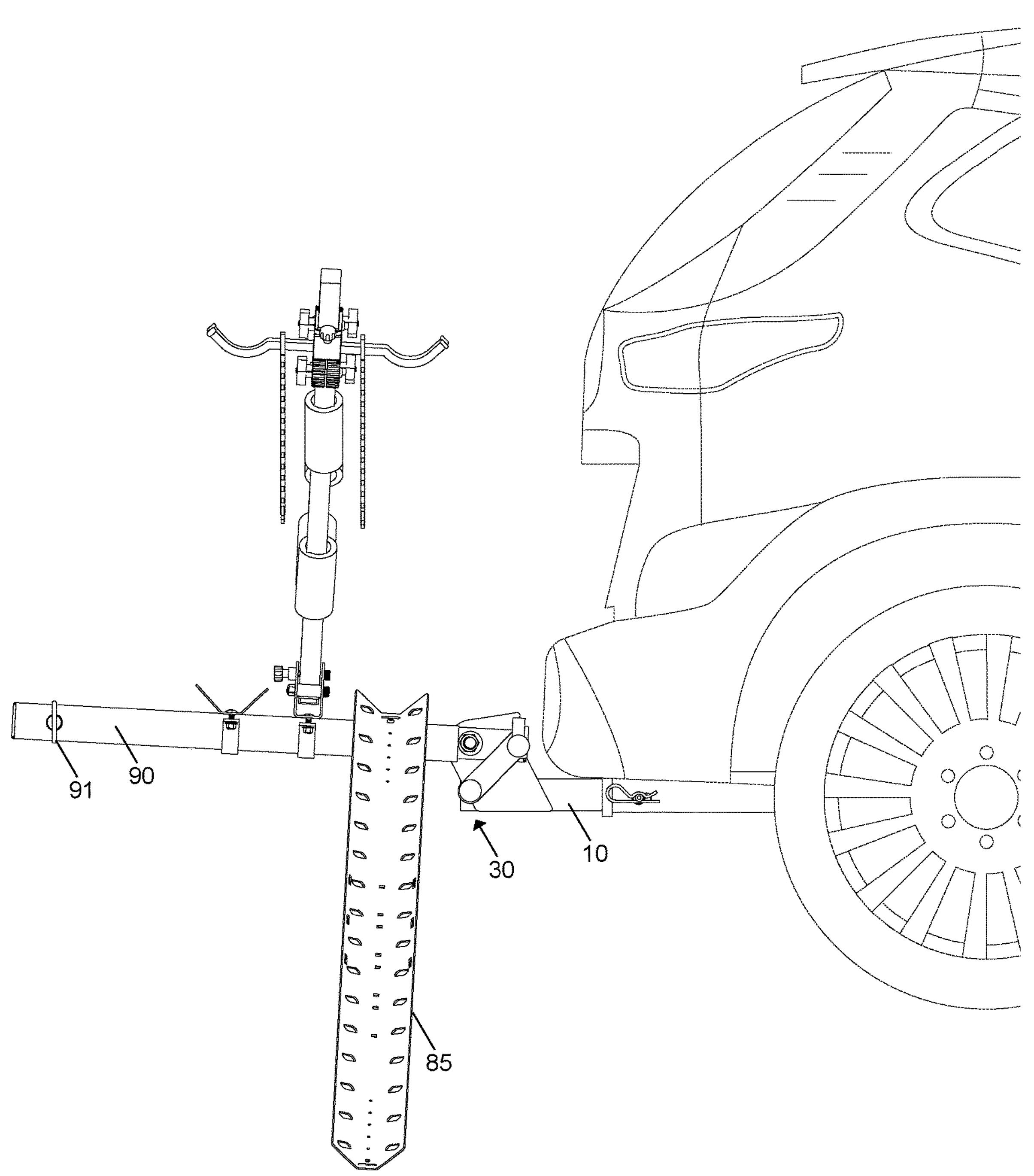
FIG. 13 is side view of the pivoting twin tube system.
Figure 14:
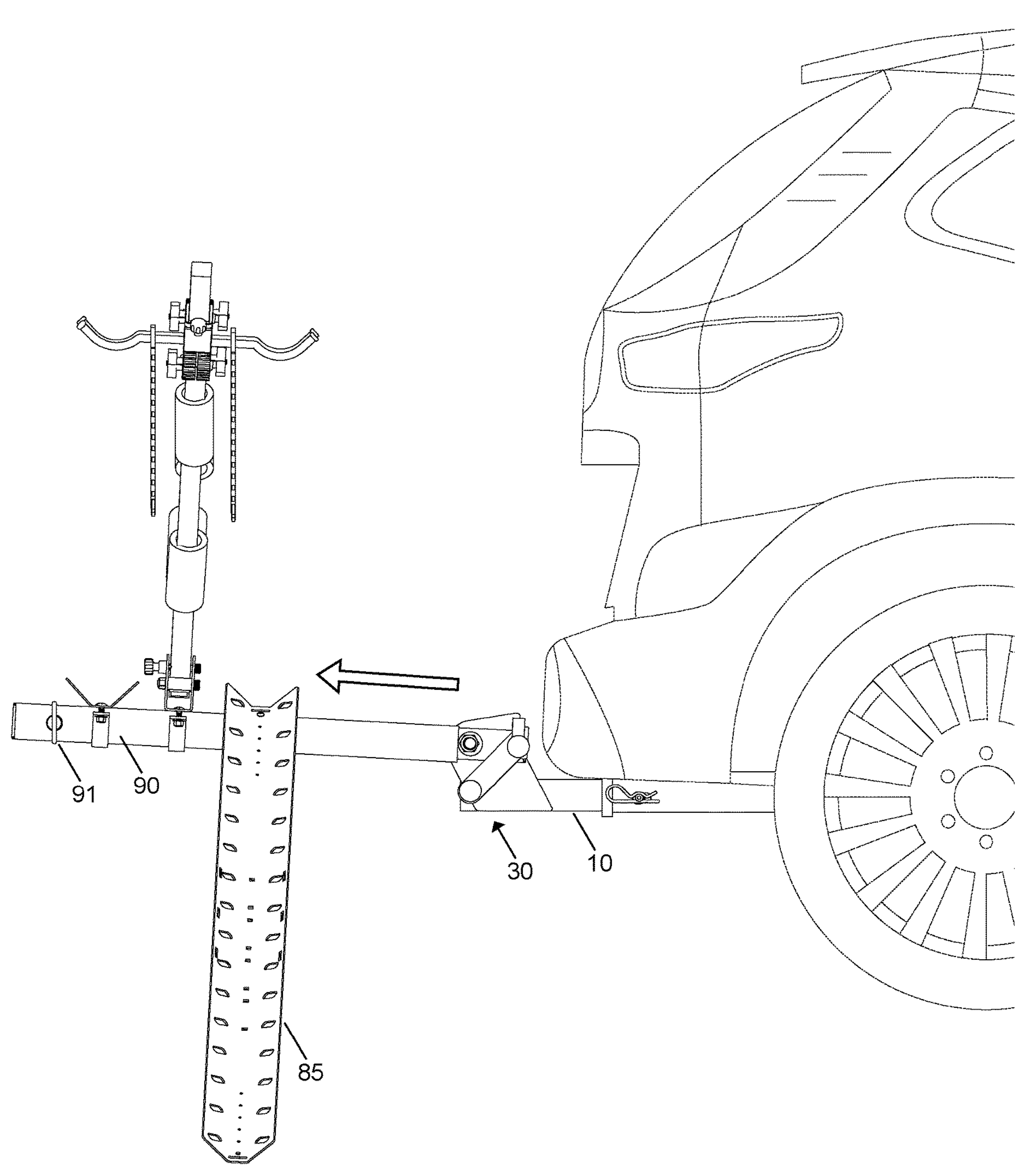
FIG. 14 is side view of the pivoting twin tube system with the extension tubes in place.
Figure 15:
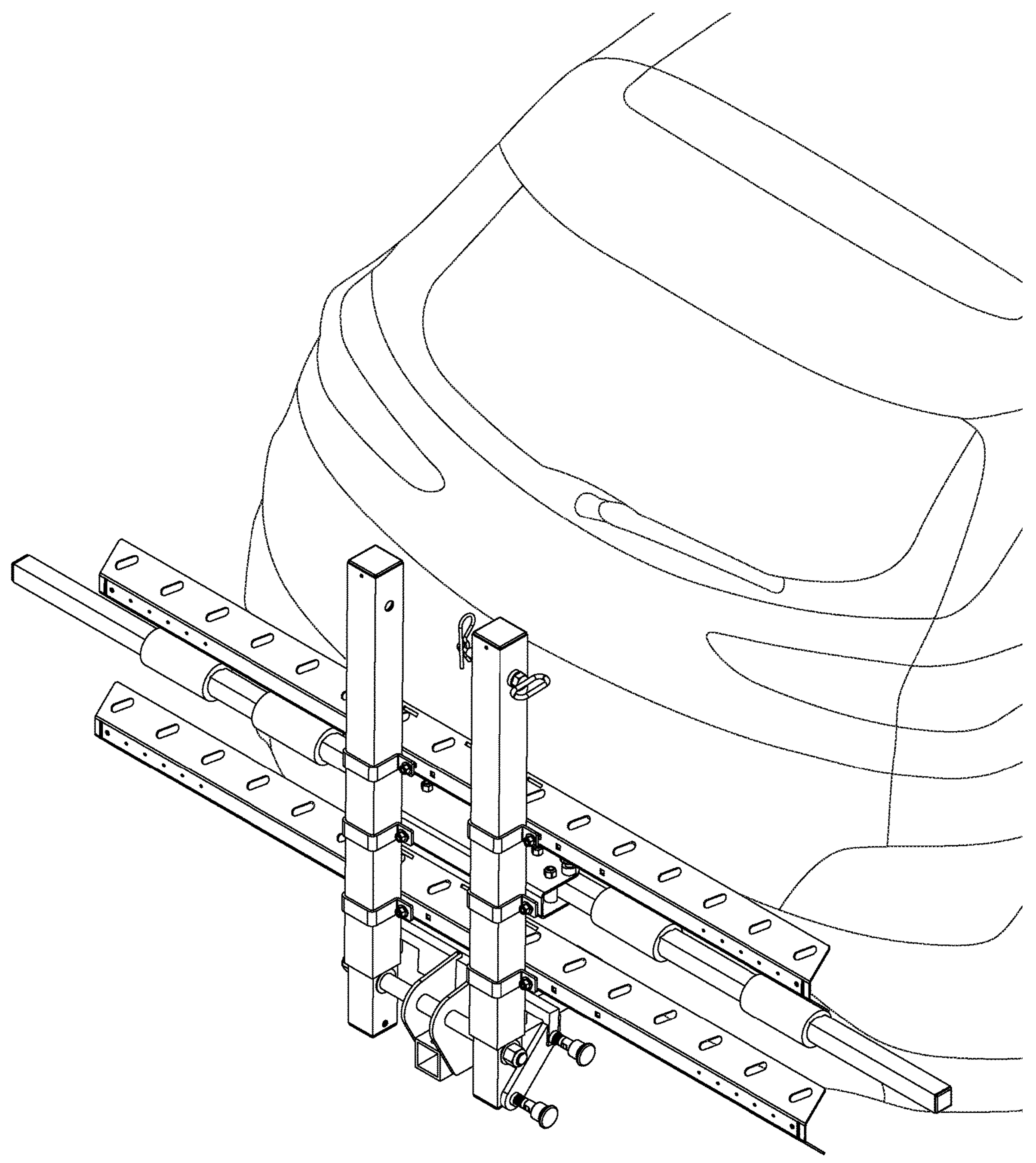
FIG. 15 is an elevated side view of the pivoting twin tube system locked in the vertical position.

FIG. 13-15 show the entire system secured to a vehicle. FIG. 15 is an image of the entire unit with the twin tubes in the vertical position, locked in place against the rear of the vehicle.

Although the invention has been described with reference to the preferred embodiments illustrated in the attached drawing figures it is noted that equivalents may be employed and substitutions made herein without departing from the scope of the invention as recited in the claims.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Having thus described the various embodiments of the invention, what is claimed as new and desired to be protected by letters patent is a heavy duty bicycle rack with pivoting, rotatable twin tubes, metal trays, wing mounts and a loading ramp.

The invention claimed is:

1. A pivotable twin tube cargo system attachable to a vehicle hitch receiver, the system comprising:
- a shank;
- a vertical plate member having:
  - a first side with a first lower portion cutout;
  - a second side with a second lower portion cutout;
  - a back side; where
    - the shank is affixed to the back side;
  - a front side; where
    - a pivot apparatus is affixed to the front side, the pivot apparatus comprising:
      - a first pivot plate and a second pivot plate, where both the first pivot plate and the second pivot plate extend from the plate member front side;

- a first pivot plate hole;
      - a second pivot plate hole, where
        - the holes are horizontally aligned;
      - a horizontal mounting pivot pin;
- a first cargo mounting tube having:
  - a first cargo mounting tube first end with a first pivot mounting through hole located therein;
  - a second end;
- a second cargo mounting tube having:
  - a second cargo mounting tube first end with a second pivot mounting through hole located therein;
  - and a second end; where
- the horizontal mounting pivot pin is insertable through the first pivot mounting through hole, the first pivot plate hole, the second pivot plate hole and the second pivot mounting through hole.

2. The pivotable twin tube cargo system of claim 1, where:
- when the first and second mounting tubes are in the horizontal position, the first mounting tube matingly fits within the vertical plate member first lower portion cutout; and
- the second mounting tube matingly fits within the vertical plate member second lower portion cutout;
- thereby securing the first and second mounting tubes in place horizontally.

3. The pivotable twin tube cargo system of claim 1, further comprising:
- a horizontal locking apparatus to secure the first and second cargo mounting tubes in place horizontally.

4. The pivotable twin tube cargo system of claim 3, where
- the horizontal locking apparatus is inserted through a hole in the pivot plate and a horizontally aligned hole in the first cargo mounting tube.

5. The pivotable twin tube cargo system of claim 4, further comprising:
- a vertical locking apparatus to secure the first and second cargo mounting tubes in place vertically.

6. The locking apparatus of claim 5, comprising:
- an angle arm having a first end affixed to and extending outwardly from the vertical plate front side;
- an angle arm second end having a through hole; where
  - when the first and second cargo mounting tubes are in the vertical position, the vertical locking apparatus is inserted through the angle arm second end through hole and a horizontally aligned vertical locking hole in the first cargo mounting tube.

7. The pivotable twin tube cargo system of claim 1, further comprising:
- a first extension tube removeably connectable and securable to the first cargo mounting tube; and
- a second extension tube removeably connectable securable to the second cargo mounting tube, where
- the first extension tube and the second extension tube are configured to extend the length of the first cargo mounting tube and the second cargo mounting tube.

8. The pivotable twin tube cargo system of claim 7, where the bicycle tray is affixed using hat brackets.

9. The pivotable twin tube cargo system of claim 1, further comprising:
- a bicycle tray; where
  - the bicycle tray is removeably affixable to the first and second mounting tubes.

10. The pivotable twin tube cargo system of claim 9 further comprising an adjustable V-shaped bicycle rack having a first wing and a second wing.

11. The adjustable V-shaped bicycle rack of claim 10 where the first wing and the second wing are extendable and rotatable.

12. The adjustable V-shaped bicycle rack of claim 9 further comprising a wheel hanger so that a bicycle wheel is secured by the wheel hanger.

13. The adjustable V-shaped bicycle rack of claim 12 further having a loading ramp.

* * * * *